United States Patent [19]

Derr

[11] 4,322,132

[45] Mar. 30, 1982

[54] COMPOSITE VENT WINDOW AND REAR-VIEW MIRROR

[76] Inventor: George A. Derr, 197 Buckshire Dr., Holland, Pa. 18966

[21] Appl. No.: 148,418

[22] Filed: May 9, 1980

[51] Int. Cl.³ ............................ G02B 7/18; B60J 1/20
[52] U.S. Cl. ........................................ 350/307; 49/70; 98/2.12
[58] Field of Search .................... 350/307; 248/475 R, 248/475 B, 476, 479, 481–484; 49/70; 98/2.12

[56] References Cited

FOREIGN PATENT DOCUMENTS

| 2037555 | 2/1972 | Fed. Rep. of Germany | 350/307 |
| 2546759 | 4/1977 | Fed. Rep. of Germany | 248/475 B |
| 2704226 | 8/1978 | Fed. Rep. of Germany | 350/307 |
| 2745316 | 4/1979 | Fed. Rep. of Germany | 350/307 |

Primary Examiner—Jon W. Henry
Attorney, Agent, or Firm—Frederick J. Olsson

[57] ABSTRACT

Vent window and rear-view mirror are integrated to provide a composite, unitary structure which achieves important advantages not available with conventional separate windows and mirrors.

10 Claims, 8 Drawing Figures

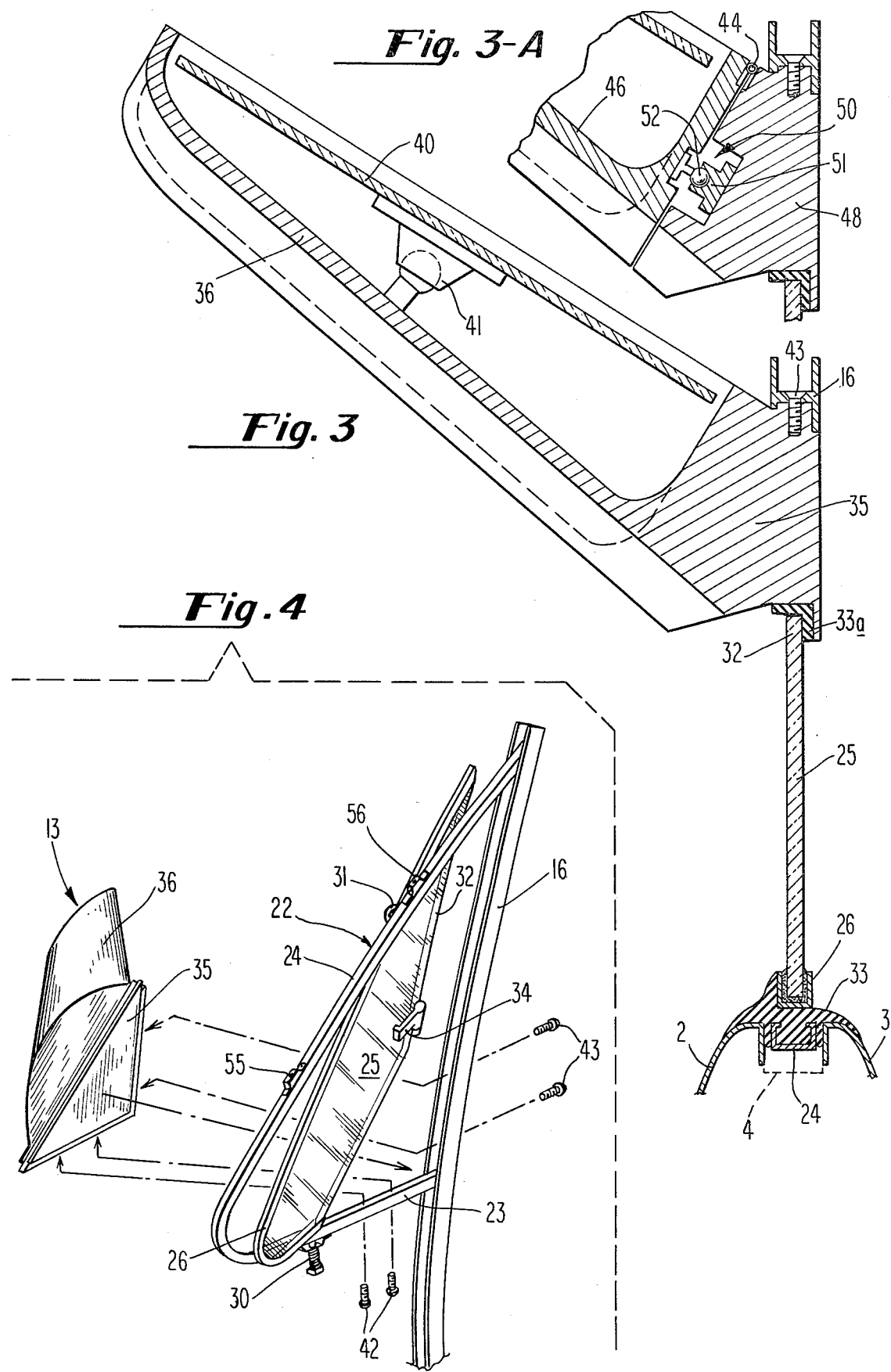

COMPOSITE VENT WINDOW AND REAR-VIEW MIRROR

This invention relates to motor vehicle accessories and particularly to vent windows and side rear view mirrors for trucks.

The concept of this invention is to integrate a vent window and a side rear view mirror into a structure which can be provided to truck manufacturers as a composite unit so that the unit as a single entity can be installed in a door. The concept attains highly important and special advantages.

Such advantages broadly relate to safety, corrosion resistance, rigidity, aerodynamics, reduction in vehicle assembly operations, inventory and production control, record keeping, materials handlings and aesthetics.

The above advantages will be discussed in conjunction with the description of the composite which is set forth below taken in connection with the attached drawings wherein:

FIG. 3 is an enlarged section view taken on the lines 3—3 of FIG. 1;

Figure 1:
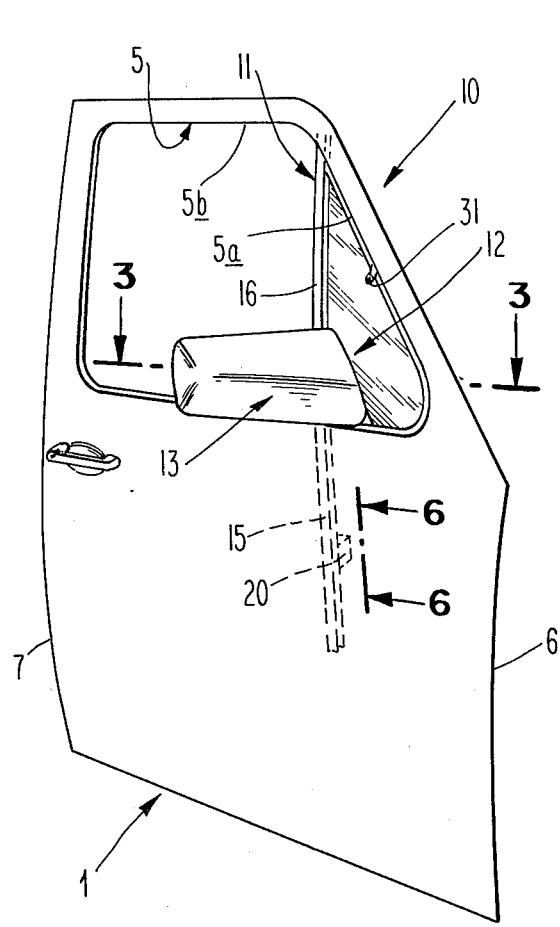
FIG. 1 is a perspective view of the right hand door of a vehicle having the composite installed therein.
Figure 5:
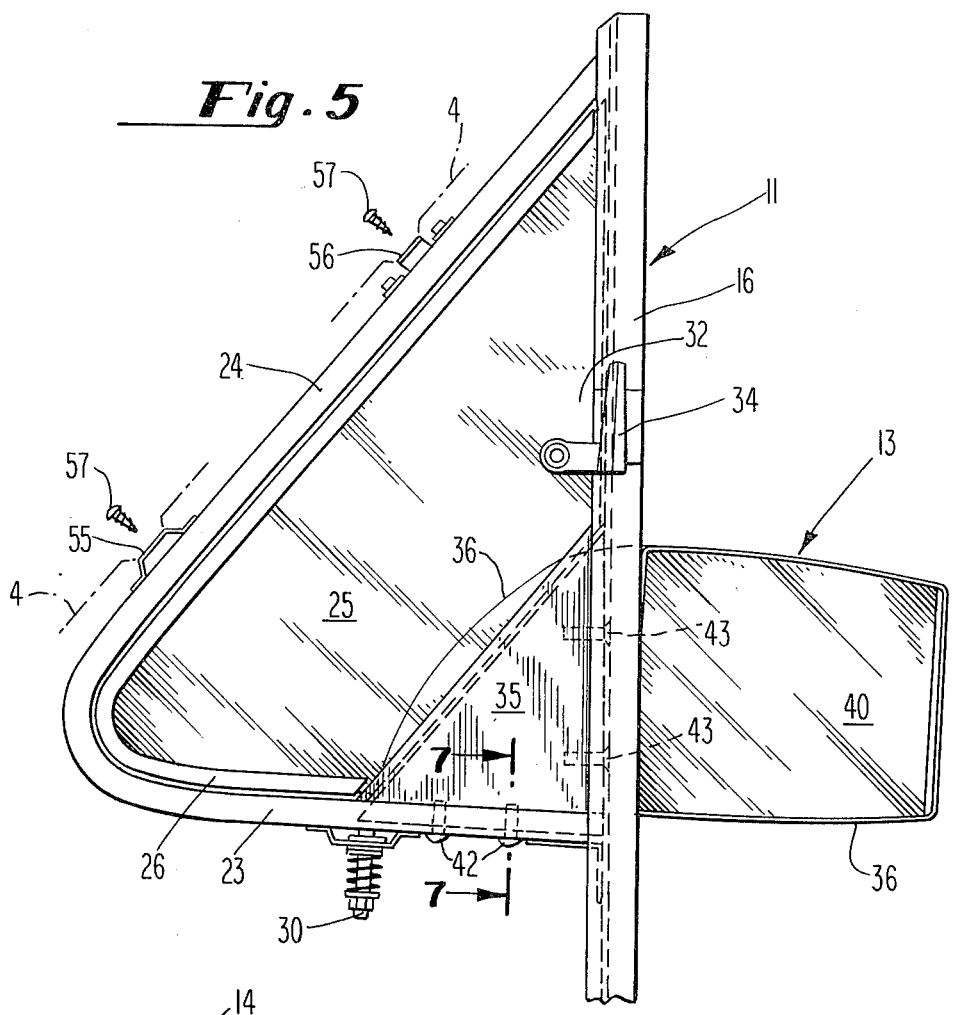
Figure 6:
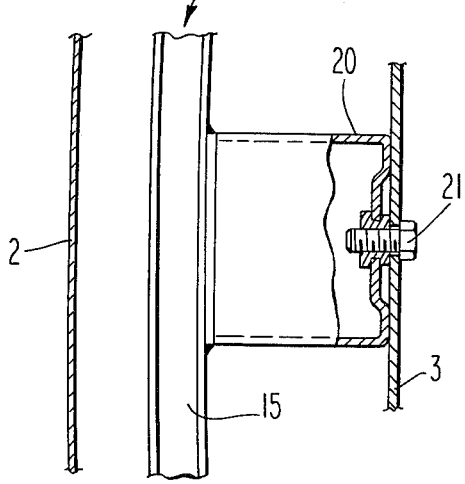

FIG. 3-A is a fragmentary view to illustrate a breakaway arrangement;

FIG. 4 is an exploded view of the composite;

FIG. 5 is a side elevation of the composite as viewed from a position similar to that from inside the vehicle;

FIG. 6 is a sectional view taken along the lines 6—6 of FIG. 1; and

Figure 7:
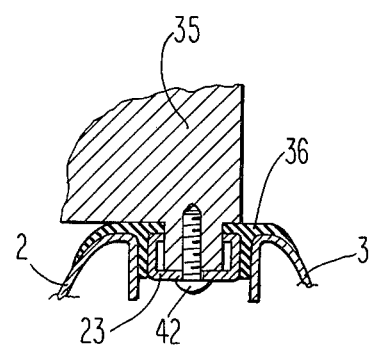

FIG. 7 is a sectional view taken along the lines 7—7 of FIG. 5;

While use of the composite with trucks is referred to herein, will be understood that the unit is equally applicable to other type vehicles.

A conventional right hand truck door 1 illustrated in FIG. 1 has outer and inner panels 2 and 3 (FIG. 6) and has certain internal structure not shown. The panels 2 and 3 are joined together around outer periphery as indicated at joint 4 in FIG. 3. The panels are formed with a window opening 5 which extends across the upper part of the door from front 6 to rear 7. The forward part of the opening is triangular in shape as noted at 5a and the remaining part of the opening is generally rectangular as noted at 5b.

The composite vent/mirror 10 is mounted in the forward, triangular opening 5a. A section of glass (not shown) is mounted between the panels 2 and 3 below rectangular opening 5b and can be rolled up and down to cover and uncover the opening 5b.

The composite 10 comprises a frame means 11 structured to be disposed in the triangular opening 5b between the panels 2 and 3, a vent window means 12 pivotally mounted in the frame means 11 for rotation between open and closed positions together with rear view mirror means 13 fixedly secured to the frame means 11 and extending outwardly therefrom in a viewing position.

The composite 10; i.e. the frame means 11, the vent window means 12 and rear view mirror means 13 is a unitary, separate assembly which (FIG. 2) is adapted to be brought up to and then installed on the door and locked in position between the panels.

Thus, in vehicle manufacture single assemblies are fed to the assembly line for installation on a door rather than feeding separate mirror and vent assemblies as has been the procedure heretofore.

This relatively simple concept results in many important advantages in the vehicle manufacturing process and during the service life of the composite. Such advantages are commented on later.

The structure of the composite 10 will now be described:

The frame means 11 has vertically extending division bar 14 which is contoured to conform with the contour of the door 1. The bar has a lower portion 15 and an upper portion 16. The lower portion has a bracket 20 by means of which the lower portion is secured to inner panel 3 (FIG. 6) by the nut bolt assembly 21. As best noted in FIG. 1, when the composite is installed the division bar separates the openings 5a and 5b.

On the side facing the opening 5b, the bar has a channel to accept a gasket and one edge of the window for the opening 5b.

A triangular shaped frame 22 is secured to the division bar 14. The frame includes the lower arm 23 and upper arm 24. The lower arm 23 joins the division bar at the bottom of upper section 16 and extends out generally normal thereto. The upper arm 24 is joined to the division bar at the upper end of section 16 and extends outwardly at an angle to join the lower arm 23.

A vent or vent window means comprising a transparent plastic or glass piece 25 is nested in a channel 26. The channel 26 is secured to the arms 23 and 24 as by pivot means 30 and 31 which support the vent window for rotary movement as between a closed position (FIGS. 1 and 2) and any of several open positions (FIG. 4). The pivot 30 is spring loaded for adjusting amount of force necessary to move the vent.

Figure 2:
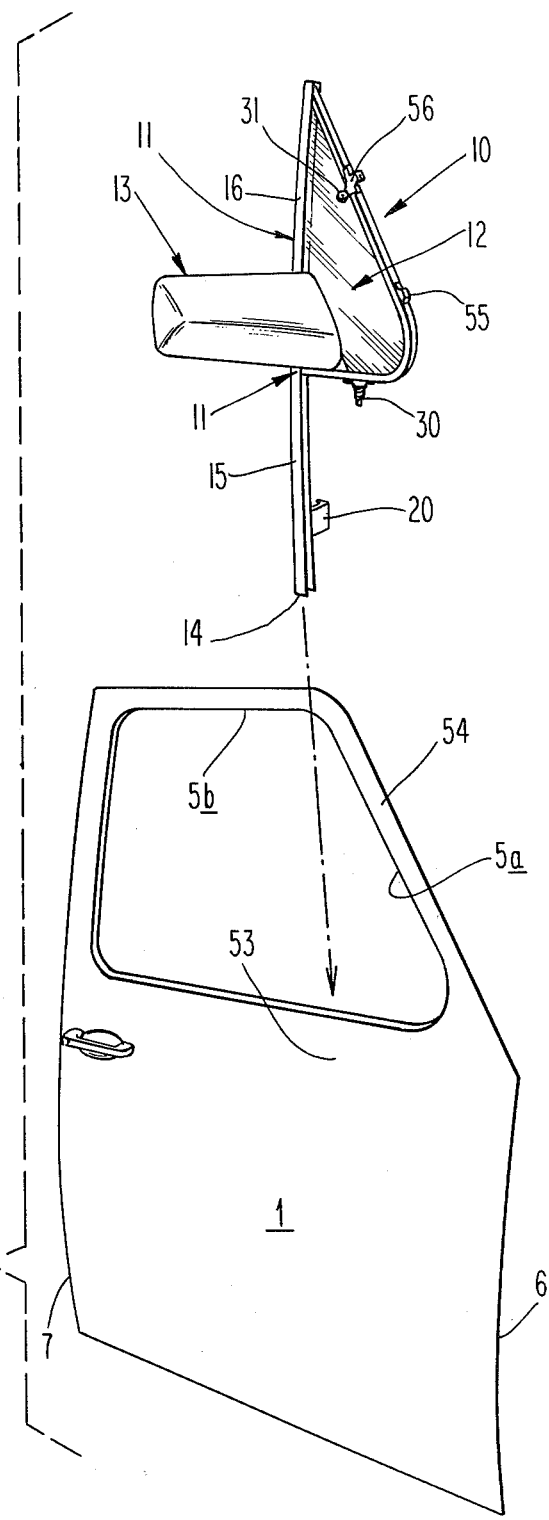
FIG. 2 is an exploded view of the door and composite of FIG. 1.

For the sake of clarity, FIGS. 1, 2 and 4 do not illustrate sealing gasket means on the arm 23 and 24 and on the upper part 16 of the division bar. In the closed position, the channel 26 engages such a gasket on the arm 23 and 24 and the edge 32 of the glass 25 engages such a gasket on the upper section 16. The nature and general shape such gasket means is illustrated at 33 in FIGS. 3 and 4. The edge 32 of the glass carries is a twist latch 34 operating against the upper portion 16 of the division bar to lock the window in closed position.

The rear view mirror means 13 comprises a base section 35 and a mirror housing section 36 which supports the mirror 40. As noted, the outer surface of the housing section 36 is contoured. The housing section has a ball joint 41 which adjustable mounts the mirror 40. The housing sections extends outwardly from the plane of the frame means 11 at an angle (FIG. 3) in a viewing position to provide the proper orientation for a driver inside the vehicle to view the mirror 40.

The base 35 is structured to nest within the lower arm 23 and within the upper section 16 and is respectively secured to same as by screws 42 and 43.

In connection with the sealing gasket means (not shown) which is operative in the closed position of the vent referred to above, it is to be observed that such gasket means extends along the base 35 (as noted at 33a in FIG. 3) so as to be engaged by the edge 32 of the glass in the closed position.

The mirror housing structure shown in FIG. 3 is the non-breakaway type. The structure may be modified as shown in FIG. 3 to provide the breakaway feature. Thus, hinge means 44 connects the base section 45 with the housing section 46, the base and housing being releasably held in the position of FIG. 3 by latch means 50.

The latch comprises a socket 51 secured to base 45 and a ball 52 secured to housing 46. The socket has several flexible fingers which receive the ball and generate sufficient force to hold the ball under normal driving conditions.

When the housing section is engaged or engages by some object and the engagement generates sufficient force in the clockwise direction, the fingers will yield against the force of the ball and allow the ball to withdraw so that the housing section can rotate clockwise about the hinge 44. The housing can be put back in the original position by rotating counter-clockwise.

Referring back to FIGS. 2 and 5 the installation and the securing of the composite 11 is further commented on.

The door 1 is held in an appropriate fixture. The composite 10 is moved up to the door and turned sidewise (with the plane of the vent normal to the door) so that the lower section 15 and its bracket 20 can be slipped down between the panels 2 and 3 in the area noted at 53. The composite is then turned about 90° and maneuvered so that the lower arm 23 and the gasket means are between the panels 2 and 3 in the area 53 (see FIG. 7) and also so that the upper arm 24 and gasket means are between the panels 2 and 3 in the slanted area 54. In the latter position, the screw receivers 55 and 56 on the arms 24 are closely adjacent the joint 4. There are pre-cut slots in the joint 4 and the receivers 55 and 56 appear below the joints. Self tapping screws 57 are then employed in the receivers to lock the arm 24 in firm engagement with the joint. The bracket 20 on the lower section 15 is secured as previously noted. Various of the advantages of the invention will now be commented on.

The composite vent/mirror has the affect of minimizing the cost and the headaches associated with the necessary functions inherent in manufacturing such as receiving, storage, materials handling, inventory control, production control, quality control, assembly and record keeping for same. For example, it becomes apparent that a complete assembly operation is eliminated with a consequent reduction in labor costs and reduction in assembly time. The whole record keeping arrangement is relieved of one component which enhances the accuracy of inventory and production control. The materials handling system is also relieved of one component which simplifies the logistics from storage to arrival at assembly point. All of the foregoing advantages are condusive to lowering manufacturing cost.

The typical vehicle door in the areas 53 and 54 is structured so that vibration in these areas is minimized. The providing of a composite vent/mirror and mounting and securing the composite in these areas takes advantage of this structural condition.

Thus, the mirror 40 can be disposed closer to the center of the opening 5 and as a consequence closer to the driver. This immediately leads to several safety features.

The mirror and its housing can be smaller in the sense that the outward projection necessary for the rear view function can be substantially reduced over the conventional rear view mirror, for example, as much as three inches. Thus, the housing becomes a smaller target available for contact and also becomes a smaller protrusion with consequent reduction in striking potential.

The mirror by being closer to the driver greatly reduces the amount of head movement necessary for the dirver's eyes to observe the rear condition in the mirror and greatly increases the speed with which the rear condition can be spotted. Reduction of head movement and increase in speed of observation are important from the safety standpoint.

The unitary, contoured housing connected to and projecting from the high strength area eliminates the customary braces and brackets used for mounting truck side view mirrors. This produces benefits in safety and in corrosion resistance.

Conventional brackets and braces are secured to the door by terminations secured to the outside panel at positions substantially below the bottom of the opening 5 and sometimes extend upwardly to terminate at the top of the door or along the slanted area 54. In any event the bracket and braces encompass a substantial vertical area projecting from the door. This increases the risk of contact far above the risk arising from the housing described herein. Moreover the tubular or strap like brackets or braces present a far greater risk to pedestrians than the contoured housing 36 particularly from the standpoint of the results of impact.

The attachment of the conventional braces and brackets to the door immediately creates a corrosion problem. The bracket or brace is secured by self tapping screws operating in holes drilled in the outside panel. Since the sides of the holes are bare metal, corrosion is certain and does occur. There are no such outside bare metal contacts with the instant composite.

Another fault of the conventional bracket/brace arrangement is that in the event of substantial engagement force, the bracket or brace may be pulled away from the panel and cause damage which is usually very expensive to repair.

The elimination of the conventional brackets and braces by use the composite unit herein results in the vibratory characteristic of the mirror to be virtually independent of the flutter or vibration of the outside door panel.

In the conventional arrangement, the bracket connection to the door is made at one or more points on the panel where there is broad expanse of flat metal. The flexing of the metal arising out of the motion of the vehicle over the road causes the brackets and therefore mirror to vibrate. The composite unit by not being connected to such flat metal areas is not subject to the results of metal flexing.

The providing of a composite vent/mirror unit and mounting same in the high strength areas 53/54 of the door are advantageous in providing for the mirror to be mounted in a contoured housing or cover. The contour eliminates sharp projections which is highly desirable from a pedestrian standpoint. Moreover, the contour can be formed to minimize wind resistance and thereby contribute to gas economy, while at the same time be aesthetically pleasing.

I claim:

1. For a motor vehicle door formed with an opening extending from front to rear across the upper part thereof, a composite window and rear view mirror unit to be installed on and secured to the door as a single entity, the unit comprising:
frame means;
window means;

support means supporting said window means on said frame means;
a rear view mirror;
mounting means mounting said rear view mirror on said frame means to extend outwardly therefrom; and
said frame means, window means, support means, rear view mirror and mounting means forming a composite unit to be installed as a single entity on said door and secured thereto by that:
(a) said frame means, window means, support means, rear view mirror, and mounting means are respectively dimensioned to provide for said frame means to be inserted and positioned in said opening wherein the frame means engages portions of the door; and
(b) said frame means includes mechanism for use in securing the frame means to said door when inserted and positioned as aforesaid.

2. A composite unit in accordance with claim 1 wherein:
said window means is a vent window; and
said support means supports said vent window on said frame for movement between open and closed positions.

3. A composite unit in accordance with claim 1 wherein:
said window means is a vent window; and
said support means comprises pivot mean on said frame means and mounting said vent window for rotation between open and closed positions.

4. A composite unit in accordance with claim 1 wherein said mounting means includes breakaway means comprising:
a base fixedly connected to said frame means;
a mirror housing extending outwardly from said base and carrying said rear view mirror; and
hinge means and releasable latch means connecting said base and said housing, the latch means comprising a ball connected to said mirror housing and flexible fingers connected to said base to receive and yieldably retain said ball, the hinge means providing for the housing and its mirror to rotate and the flexible fingers providing that when the housing is contacted with sufficient force the housing will rotate by that the flexible fingers release the ball.

5. For a motor vehicle door having inner and outer spaced apart panels, the panels being formed with a window opening extending from front to rear across the upper part thereof, a composite vent window and rear view mirror unit to be installed on and secured to the door as a single entity, the unit comprising:
frame means having a section to be inserted between said panels partly below said opening and a section to be inserted in said opening;
a vent window;
support means supporting said vent window on said frame means for movement between open and closed positions;
a rear view mirror;
mounting means mounting said rear view mirror on said frame means to extend outwardly therefrom; and
said frame means, vent window, support means, rear view mirror and mounting means forming a composite unit to be installed as a single entity on said door and secured thereto by that:
(a) said frame means, vent window, support means, rear view mirror and mounting means are respectively dimensioned to provide for said frame means to be inserted and positioned between said panels and in said opening as aforesaid wherein the frame means engages portions of the door; and
(b) said frame means includes mechanism for use in securing the frame means to said door when inserted and positioned as aforesaid.

6. For a motor vehicle door having inner and outer spaced apart panels, the panels being formed with a window opening extending from front to rear across the upper part thereof and the opening being formed with a triangular shaped portion in the front part of the opening, a composite vent window and rear view mirror unit to be installed on and secured to the door as a single entity, the unit comprising:
frame means having one section to be inserted between said panels partly below said opening and another triangular shaped section to be inserted in said triangular shaped portion;
a vent window;
pivot means supporting said vent window on said frame means for rotation between open and closed positions;
a rear view mirror;
mounting means mounting said rear view mirror on the triangular shaped section of said frame means to extend outwardly therefrom; and
said frame means, vent window, pivot means, rear view mirror and mounting means forming a composite unit to be installed as a single unit on said door and secured thereto by that:
(a) said frame means, vent window, pivot means, rear view mirror and mounting means are respectively dimensioned to provide for said one section of the frame means to be inserted and positioned between said panels and for said triangular shaped section of the frame means to be inserted and positioned in said triangular shaped portion of the said opening as aforesaid wherein said sections of the frame means respectively engage portions of the door; and
(b) said frame means includes mechanism for use in securing the frame means to said door when inserted and positioned as aforesaid.

7. A composite unit in accordance with claim 6 wherein said mounting means includes breakaway means comprising:
a base fixedly connected to said frame means;
a mirror housing extending outwardly from said base and carrying said rear view mirror; and
hinge means and releasable latch means connecting said base and said housing, the latch means comprising a ball connected to said mirror housing and flexible fingers connected to said base to receive and yieldably retain said ball, the hinge means providing for the housing and its mirror to rotate and the flexible fingers providing that when the housing is contacted with sufficient force the housing will rotate by that the flexible fingers release the ball.

8. For a vehicle door having inner and outer spaced apart panels with connecting means disposed adjacent to the peripheral edge of the panels joining the same together, the panels being formed with an opening extending from front to rear across the upper part thereof and having a rectangular shaped portion and a triangular shaped portion in the front part of the opening, a composite vent window and rear view mirror unit to be installed on and secured to the door as a single entity, the unit comprising:

an elongated division bar having a lower portion and an upper portion, the lower portion for use in being positioned between said panels below the opening and the upper portion to be positioned to extend across said opening to separate said rectangular and triangular shaped portions;

triangular shaped frame means having a lower arm and an upper arm, the lower arm being connected to said upper portion and extending normally outwardly therefrom and the upper arm also being connected to said upper portion and extending outwardly at an angle therefrom and joined to the lower arm, together with sealing gasket means mounted on arms for use in engaging said panels along the triangular shaped portion of said opening;

mirror mounting means disposed at the intersection of said upper portion and said lower arm and fixedly connected thereto and extending outwardly from said triangular shaped frame means at an angle to the plane thereof;

a rear view mirror mounted on said mirror mounting means;

window means;

support means supporting said window means on said frame means; and said division bar, triangular shaped frame means, mirror mounting means, rear view mirror, window means, and support means forming a composite unit to be installed as a single unit on said door by that:
  (a) said division bar, triangular shaped frame means, mirror mounting means, rear view mirror, window means and support means are respectively dimensioned to provide for said division bar to be insrted in and between said panels and for triangular shaped frame means to be inserted and positioned in the triangular shaped portion of said opening wherein the division bar means engages portions of at least one panel and said sealing gasket means on the triangular shaped frame means engages said panel connecting means; and
  (b) said division bar includes mechanism for use in securing the bar to at least one of said panels and said triangular shaped frame means includes mechanism for use in securing the frame to the panel connecting means.

9. A composite unit in accordance with claim 6 wherein:

said window means is a vent window; and said support means comprises upper and lower pivot means on said triangular shaped frame means and mounting said vent window for rotation between open and closed positions.

10. For a motor vehicle door formed with an opening extending from front to rear across the upper part thereof, the subcombination for use in a composite window and rear view mirror unit to be installed on and secured to the door as a single entity, the subcombination comprising:

frame means;

window means;

support means supporting said window means on said frame means;

mounting means on said frame means for mounting a rear view mirror on the frame means to extend outwardly therefrom; and said frame means, window means, support means, and rear view mirror mounting means forming a composite unit to be installed as a single entity on said door and secured thereto by that:
  (a) said frame means, window means, support means, and mounting means are respectively dimensioned to provide for said frame means to be inserted and positioned in said opening wherein the frame means engages portions of the door; and
  (b) said frame means includes mechanism for use in securing the frame means to said door when inserted and positioned as aforesaid.

* * * * *